Patented Feb. 5, 1929.

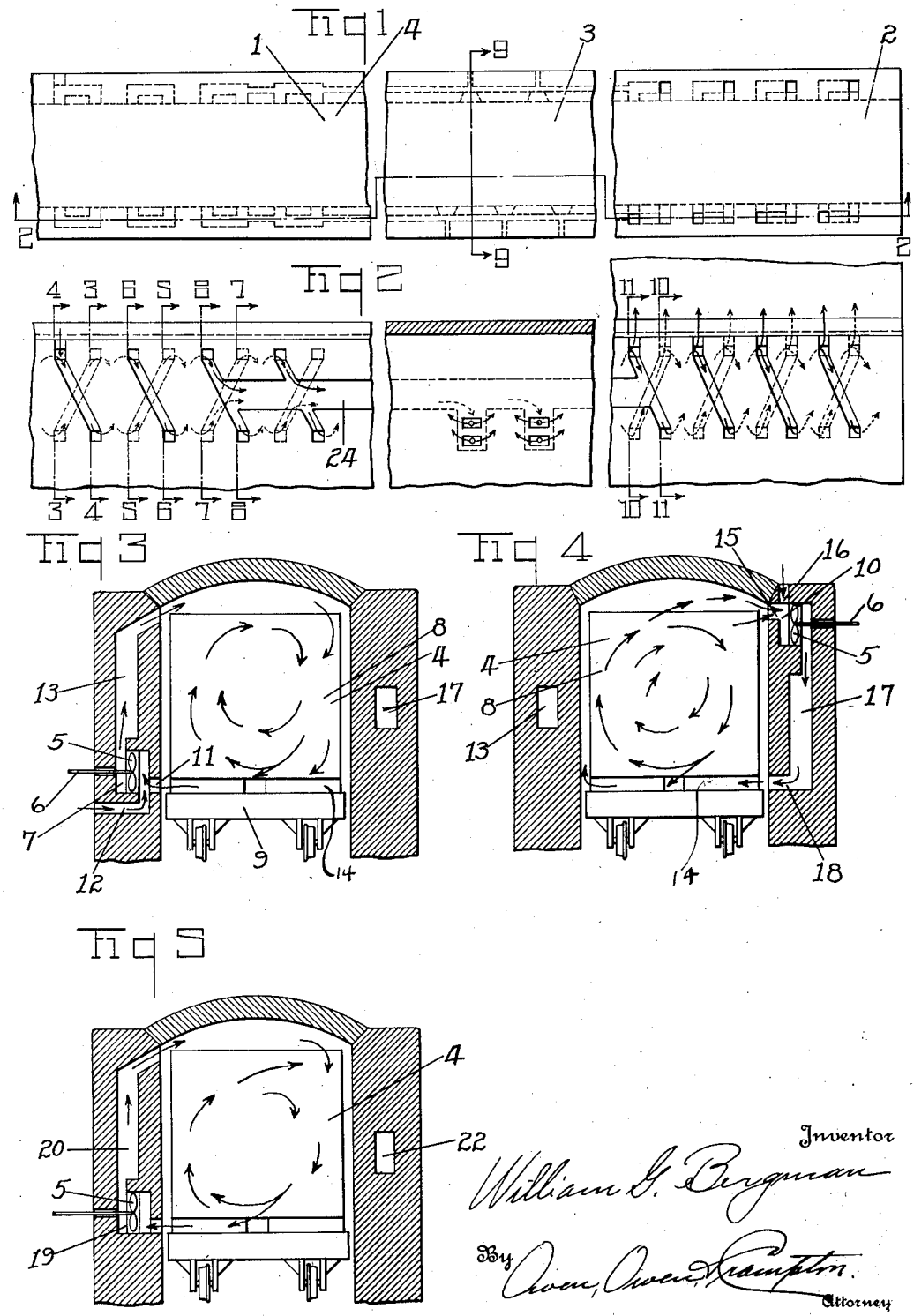

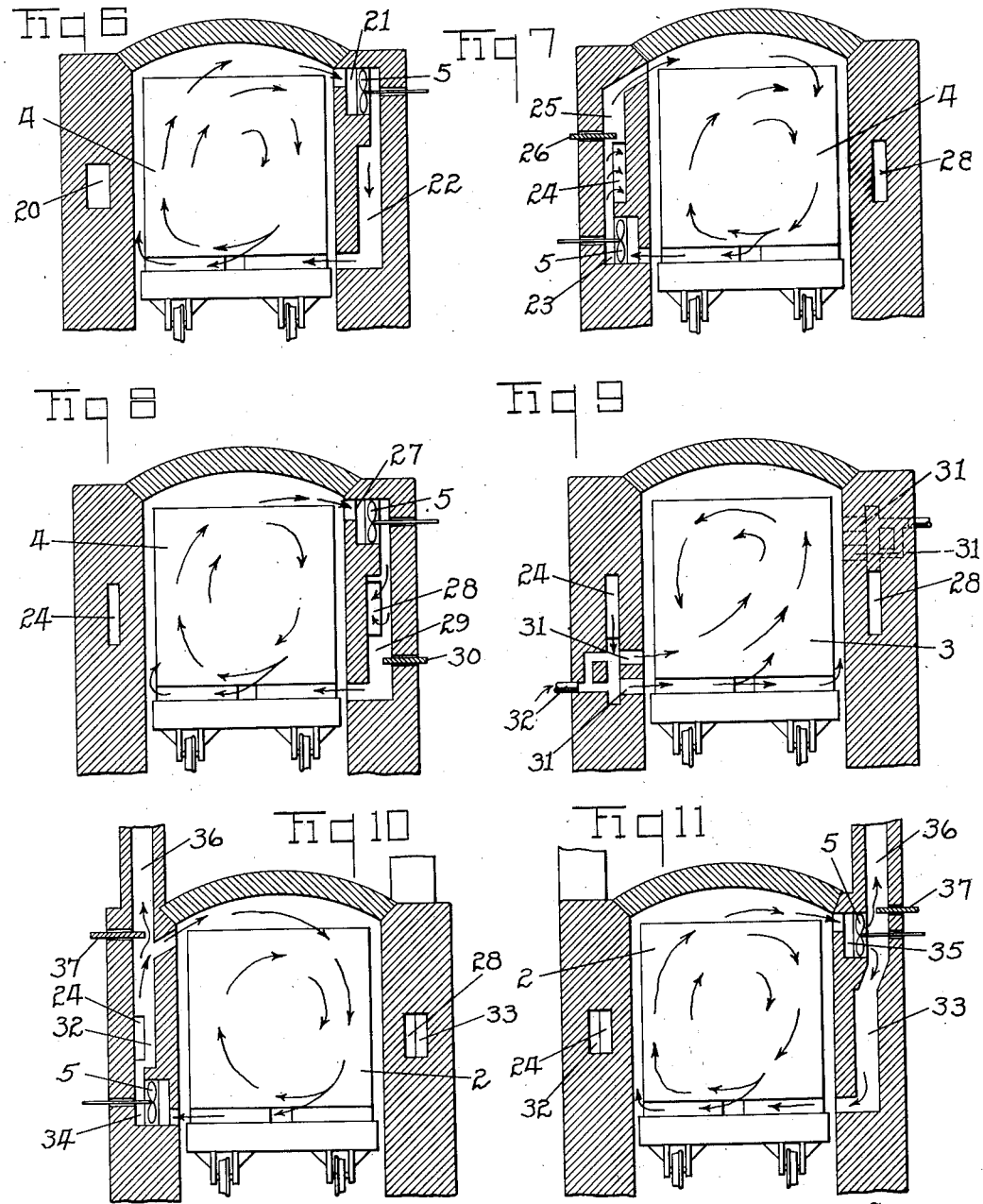

1,701,223

UNITED STATES PATENT OFFICE.

WILLIAM G. BERGMAN, OF POINT PLACE, OHIO, ASSIGNOR, BY DIRECT AND MESNE ASSIGNMENTS, OF ONE-HALF TO DANA P. OGDEN, OF OTTAWA, ILLINOIS, AND ONE-HALF TO ERMIN F. PLUMB, OF STREATOR, ILLINOIS.

FURNACE AND METHOD OF TREATING BODIES THEREIN.

Application filed April 18, 1924. Serial No. 707,341.

My invention has for its object to provide a furnace and a method for heat treating ceramic bodies, wherein a spiral movement of the air will be produced throughout the length of the furnace in order to produce uniform heating and uniform cooling throughout the ceramic bodies as the ceramic bodies are progressively conveyed through the heating, firing and cooling zones or chambers of the furnace, and to produce a thorough mixture of air introduced in the firing zone or chamber with the fuel in various stages of combustion, in order that the combustion of the fuel may extend over long and circuitous lines that surround and enter between the ceramic bodies and greatly extend the firing zone and render uniform the effect of the firing operation. Thus the furnace not only provides for uniformity of temperature both in the heating and the cooling of the ceramic bodies in planes substantially at right angles to the direction of movement of the ceramic bodies through the furnace, but also a uniform change of temperature along the line of direction of movement of the ceramic bodies through the furnace.

The invention may be contained in furnaces which in their details vary in form. To illustrate a practical application of the invention, I have selected a furnace containing the invention as an example of such furnaces and shall describe it hereinafter. The furnace selected is shown in the accompanying drawings.

Figure 1 of the drawings illustrates a top broken view of the furnace. Figure 2 illustrates a sectional view taken on the line 2—2 indicated in Fig. 1. Figures 3 to 11 illustrate transverse sectional views of the furnace taken on the lines 3—3 to 11—11 indicated in Figs. 1 and 2.

The furnace shown in the drawings is for firing bricks that are piled on trucks or small flat cars, the bricks having surfaces that are placed in spaced relation with respect to each other in the manner well known in the art of burning bricks, whereby the moisture contained in the bricks may be allowed to pass off through the passageways formed by the spaced relation existing between bricks of a given layer or row, as well as permitting the fuel mixture and the products of combustion to enter between the bricks and thus heat the bricks within the piles or loads on the cars that are used to convey the bricks. The furnace 1 is thus provided with the usual track and cars for carrying the bricks through the furnace, the bricks being gradually raised in temperature and fired and then gradually cooled, the movement of the bricks being preferably continuous and sufficiently slow to permit efficient heat treatment and firing of the brick. The ceramic bodies enter the drying or temperature raising chamber or zone 2 which is located at one end of the furnace and are conveyed through the firing zone or chamber 3 and then through the cooling zone or chamber 4. The cooling zone of the furnace is located at the delivery end of the furnace. The zones or chambers are sufficiently long to give opportunity for these parts of the furnace to function properly and perform the desired operations on the brick, either pyrophysical or pyrochemical. Figures 1 and 2 show merely portions of the zones or chambers that make up the furnace.

The temperature changes, that is, the rate of change of the temperature of the brick as it passes through the zones, is controlled by the rate at which the air is drawn into the furnace and circulated either throughout its length or through parts of the furnace. The air is moved not only lengthwise of the furnace from the delivery end of the furnace to the firing chamber and on to the temperature raising and drying chamber of the furnace, but is moved spirally throughout the entire interior of the furnace by means of fans that draw the air from the furnace and also, where desired, from the exterior atmosphere, and direct it into the furnace at a point in advance of the point from which it is drawn from the furnace, whereby there is a continuous circular movement produced within the furnace and also a constant forward movement of the air from the delivery end of the furnace towards the entering end, which produces a spiral circulatory movement of the air and gases within the furnace.

The fans 5 are located on and driven by the shafts 6. The shafts 6 may be connected to any suitable source of power. The fans 5 are located adjacent to openings to draw the air or gases or mixtures of both from the furnace and redirect it into the furnace at another point in advance of the point at which the air or gases or mixture of air and gases is drawn by each fan. The inlets and the outlets leading to and from the fans are so located and constructed as to draw the gases from one side of the bed or roof of the furnace and direct the gases outward across the bed or roof of the furnace to produce generally a rotative movement of the gases within the furnace. The inlets and the outlets leading to and from the fans are also such as to produce rotation of the gases within the furnace in the same rotative direction, such as, in the form of construction shown, a clockwise direction. The temperature raising zone or chamber of the furnace is provided with a stack which draws the gas from the furnace. This produces a general movement of the gases throughout the length of the furnace towards the entering end of the furnace. These two movements taken in conjunction produce a spiral movement of the gases, which greatly increases the efficiency of the furnace since it maintains uniformity of moisture elimination, increase of temperature, thorough combustion over an extended area of the ceramic bodies within or substantially within the firing zone, and uniform and rapid cooling of the ceramic bodies that produces a rapid heating of the air that is subsequently utilized in the combustion chamber or firing zone. This shortens the necessary length of the furnace or kiln, increases its capacity, produces uniformity in the ware and consequently less waste both in the raw materials that make up the ware and in the fuel used to heat the furnace.

Certain of the fans 5 that are used to generate the spiral current of the gases are located in chambers 7. The chambers 7 are located near the plane of the lower sides of the ceramic bodies 8 supported on the cars 9 and in one side wall of the furnace. Other of the fans are located in chambers 10 which are located near the top of the furnace and so as to draw the gases from across the under side of the arch or roof of the furnace. Inlets 11 to the chambers 7 located substantially at the level of the platform of the cars 9 permit the air or gases or mixture of air and gases to be drawn from the interior of the furnace into the chambers 7. The cars are provided with cross flues or passageways 14 having a large cross sectional area or about the size of the inlets 11. Where bricks are fired in the furnace they are built up in spaced relation or semi-checkerwork form, in the manner well known in the art, in order to permit the gases that are directed across the tops of the cars to circulate through the passageways 14 and through the body portion of the brick loaded on the cars. The transversely extending flues are located at the level of the lower inlets and the outlets of the furnace, and consequently the gas current will move circuitously through the chamber, the passageways 14 operating materially to aid in the distribution or collection of the air or gases or products of combustion from and throughout all parts of the load on the cars. Thus portions of the gases will move through the passageways 14 across the cars and along the cars. This produces a uniform firing of the ceramic ware located on the car. Air may also be drawn into the chambers 7 from the atmosphere through the passageways 12. The air thus drawn by the fans 5 adds its cooling effect to the rotating air within this end of the furnace, and is itself heated preparatory to its introduction into the combustion chamber of the furnace. The fans 5 drive the gases diagonally upward through the passageways 13 to a point near the roof or arch of the furnace, the passageways having parts that direct the moving current diagonally inward and upward relative to the center line of the furnace. On the other side of the furnace and substantially opposite the passageways 13, the fans 5 draw the gases of the furnace into the chambers 10 through the openings 15 and also draw the air from the atmosphere through the openings 16 and direct the mixture diagonally downward and towards the entering end of the furnace through the passageways 17. The passageways 17 have parts 18 that terminate so as to direct the gases through the passageways 14 in the cars. The inlet openings of one side are preferably located in advance of the inlet openings of the other side with reference to the direction of movement of the air through the furnace. The outlet openings from the passageways of the walls of the furnace into the furnace on one side are also preferably located in advance of the inlet openings of the passageways of the wall on the other side of the furnace with reference to the general movement of the gases in the furnace. Thus the gas current induced by the fans will not be directed from the inlets of one side to the outlets of the other side of the furnace. As measured along the furnace, the arrangement of the inlets and outlets in the lower part of the cooling zone may be said to be staggered. The same is also true of the inlets and outlets of the passageways of the walls of the furnace in the upper part of the cooling zone. Any number of the chambers 7 and 10 having the inlets 12 and 16 may be located along the cooling zone of the furnace. The number of the chambers will depend upon the quantity of air that it is desired to draw in from the outside atmosphere by the operation of the fans 5, that is, it will depend upon the amount of air that it is desired to introduce into the furnace to produce the desired cooling effect and to give the desired supply of air to the firing zone of the furnace. It will also depend upon the amount of air that is forced or drawn from the furnace by the stacks and fans located in the temperature raising zone of the furnace.

One or more of the passageways 12 and 16 may be closed by dampers in which case the air will not be drawn in by the fans of the chambers associated with the closed passageways that lead from the exterior of the furnace. Or, if desired, other wall chambers such as the chamber 19 having the fan 5 may be used to draw the gases from a point at a level with the top of the platform of the cars and through the passageways 14, and force it through the passageways 20 and deliver it in a direction substantially tangential to the arch or roof of the furnace and within the top of the furnace. Also the fans 5 located in the chambers, like chamber 21, may be used for drawing the gases from the top of the furnace and directing it across the top of the platforms of the cars, the gases being conveyed through a passageway 22 formed in the side wall of the furnace. The passageways 20 and 22 are constructed substantially the same as the passageways 13 and 17, and their inlets and outlets, except for the auxiliary air inlet, are substantially the same as those of the passageways 13 and 17. These passageways are also disposed short distances apart and cause the air to spirulate without the addition of the air direct from the atmosphere, in the same manner that the passageways 13 and 17, coacting with the fans 5, cause the air to move within the furnace. In order to introduce heated air into the firing zone so that it will directly aid in the combustion of the fuel, a portion of it is drawn from the interior of the furnace by means of fans 5 located in the chambers 23, which will draw the hot air from the furnace at about the level of the top of the platforms of the cars and direct a part of the air that is thus drawn from the furnace through a passageway 24 that extends along the wall of the furnace. The remainder of the air is allowed to pass upward through the passageways 25 to be directed upwards in the interior of the furnace. The relation between the quantities of air that are thus directed through the passageway 24 and back into the furnace may be regulated by dampers 26. A similar provision may be made for drawing the air from the upper part of the interior of the furnace by means of fans 5 located in a chamber 27. The fans will direct the air into a passageway 28 and also through passageways 29 into the interior of the furnace at a level of the platforms 9 of the cars. The relation of the amounts of air directed through the passageway 28 and returned to the interior of the furnace may be regulated by the dampers 30. The passageways 25 and 29 and their inlets and outlets, except as to the passageways 24 and 28, are arranged in substantially the same way that the passageways 13 and 17 are arranged.

The passageways 24 and 28 communicate with the burners or vapor fuel or gas fuel inlets 31. The fuel is conducted to the inlets 31 by means of the pipes 42. The air entering the inlets 31 mixes with the fuel. The fuel is ignited at the fuel inlets which are located in the firing zone of the furnace. These form the burners of the furnace. Any number of burners may be used in the furnace. I have shown the burners of the opposite side walls located in staggered relation with respect to the central line of the furnace. The burners are located near the level of the platforms 9 on one side and near the upper portions of the ceramic bodies on the other side of the furnace, so that the same circuitous movement will be produced in the firing zone that is produced in the cooling zone.

The temperature raising zone, a part of which may also be the drying zone of the furnace, is provided with passageways 32 and 33 that communicate with the chambers 34 and 35 having the fans 5 which draw the products of combustion from the furnace and direct a part of them back into the interior of the furnace, and a part of them may be allowed to escape through the stacks or vents 36. The quantity of air that is allowed to escape through the vents relative to that which is directed back into the furnace may be regulated by the dampers 37. The fans 5 in the chambers 34 draw the gas from the lower part of the furnace and direct it upward to the vent and to the top of the furnace, and into the interior, while the fans 5 located in the chambers 35 draw the gas from the upper part of the furnace and direct it in part through the stack 36 and in part back into the lower part of the furnace. The passageways 32 and 33 and their outlets and inlets are arranged substantially the same as the passageways 13 and 17 to produce the spiral movement of the air through the temperature raising zone of the furnace, during which period the ceramic bodies are first uniformly dried and then uniformly raised in temperature as they approach the firing zone of the furnace.

In order to insure perfect combustion of the fuel I may direct heated air through the passageways 24 and 28 beyond the chamber in which the burners are located and through the passageways of the temperature raising zone of the furnace that are located near the fire chamber.

I have thus provided by my invention a means whereby the movement of the gases within the furnace may be controlled so that the most efficient and economical results will be produced by reason of the fact that the path of the air movement is spiral in form through the furnace. This greatly increases the length of the path of movement of the air, gases and products of combustion that are comprehended broadly by the term gas, and increases the area of contact of the gas with the ceramic bodies, whereby the air is heated to a higher temperature which produces a more efficient combustible mixture when mixed with the fuel. The flame of combustion enwraps the ceramic bodies as the gas is drawn along the furnace to more thoroughly and uniformly fire the ceramic bodies. The products of combustion are gradually drawn from the furnace in the temperature raising zone according to the humidity that is created by the bricks coming in contact with the hot gases, whereby the same circulatory movements may be produced in the temperature raising chamber of the furnace and the moisture may be withdrawn as it is conveyed to the surfaces of the ceramic bodies and to the surrounding gases.

I claim:

1. The method of cooling bodies during their heat treatment in a continuous tunnel furnace, which comprises causing air and gases to flow over the hot work in a helicoidal path through the tunnel from the outlet thereof toward the inlet, and regulating the temperatures of the flow by the introduction into the tunnel of air direct from the atmosphere at spaced points along the portion of the tunnel adjacent to the outlet.

2. The method of heating bodies during their heat treatment, which comprises moving the bodies along a tunnel furnace from the inlet thereof toward the firing chamber thereof, maintaining a countercurrent of heated air and gases moving in a helicoidal path and discharging regulable quantities of the heated gases from the tunnel to the open air at spaced points between the inlet and the firing chamber.

3. A heat-treating mechanism comprising a tunnel-like chamber having an inlet end, an outlet end, and a firing chamber between the two ends, means for maintaining a helicoidal flow of gases through said chamber from said outlet end toward said inlet end, and means for permitting the escape of regulable amounts of the flowing gases from the chamber to the open air at spaced points along the chamber between the firing chamber and the inlet.

4. A heat-treating mechanism comprising a tunnel-like chamber having an inlet and an outlet through which the work is passed, means for maintaining a helicoidal flow of air and gases from said outlet toward said inlet, and means for admitting regulable quantities of air direct from the atmosphere to said chamber at spaced points toward the outlet end of the chamber.

5. A heat-treating mechanism comprising a tunnel-like chamber having an inlet and an outlet through which the work is passed, means for maintaining a helicoidal flow of air and gases through said chamber from the outlet thereof toward the inlet, means for admitting air direct from the atmosphere at certain points along the chamber toward the outlet end, and means for removing gases from the chamber at spaced points toward the inlet end of the chamber.

In testimony whereof, I have hereunto signed my name to this specification.

WILLIAM G. BERGMAN.